(12) United States Patent
Lee et al.

(10) Patent No.: US 10,642,477 B2
(45) Date of Patent: May 5, 2020

(54) ELECTRONIC DEVICE AND METHOD FOR CONTROLLING INPUT IN ELECTRONIC DEVICE

(71) Applicant: Samsung Electronics Co., Ltd., Suwon-si, Gyeonggi-do (KR)

(72) Inventors: Young-Gyun Lee, Gumi-si (KR); Doo-Yong Park, Gumi-si (KR); Young-Dae Lee, Daegu (KR); Jae-Hak Lee, Gumi-si (KR); Min-Ho Kim, Suwon-si (KR); Cheong-Jae Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/204,513

(22) Filed: Jul. 7, 2016

(65) Prior Publication Data

US 2017/0046041 A1    Feb. 16, 2017

(51) Int. Cl.
*G06F 3/0488*    (2013.01)
*G06F 3/0354*    (2013.01)
(Continued)

(52) U.S. Cl.
CPC .......... *G06F 3/0488* (2013.01); *G06F 3/0383* (2013.01); *G06F 3/03545* (2013.01);
(Continued)

(58) Field of Classification Search
CPC . G06F 3/03545; G06F 3/04845; G06T 11/203
See application file for complete search history.

(56) References Cited

U.S. PATENT DOCUMENTS

2009/0157366 A1    6/2009    Shin et al.
2011/0251829 A1    10/2011    Baxter, III et al.
(Continued)

FOREIGN PATENT DOCUMENTS

KR    10-2012-0003766 A    1/2012
KR    10-2013-0072134 A    7/2013
(Continued)

OTHER PUBLICATIONS

Extended European Search Report dated Oct. 10, 2018, issued in a counterpart European application No. 16835493.4-1221/3335105.
(Continued)

*Primary Examiner* — Sepehr Azari
(74) *Attorney, Agent, or Firm* — Jefferson IP Law, LLP

(57)    ABSTRACT

An electronic device is provided. The electronic device includes a display including a touch panel; a processor electrically connected to the display; and a memory electrically connected with the processor, wherein the memory stores instructions executed to enable the processor to: receive, from the touch panel, first data regarding a time or an area contacted by an external object through a first region on the display, receive, from the touch panel, second data regarding a contact or an approach of the external object to a second region of the display after the external object is spaced apart from the display, and display an image or an image variation on the display based on the first data or the second data.

24 Claims, 14 Drawing Sheets
(6 of 14 Drawing Sheet(s) Filed in Color)

(51) Int. Cl.
*G06F 3/038* (2013.01)
*G06T 11/00* (2006.01)
*G06F 3/041* (2006.01)

(52) U.S. Cl.
CPC .......... *G06F 3/0416* (2013.01); *G06T 11/001* (2013.01); *G06T 2200/24* (2013.01)

(56) References Cited

U.S. PATENT DOCUMENTS

| | | | |
|---|---|---|---|
| 2011/0276891 A1* | 11/2011 | Ecko | G06F 3/017 715/739 |
| 2012/0098798 A1* | 4/2012 | Lee | G06F 3/03545 345/179 |
| 2013/0120436 A1* | 5/2013 | Krishnaswamy | G06T 11/40 345/594 |
| 2013/0127898 A1 | 5/2013 | Diverdi et al. | |
| 2013/0326381 A1* | 12/2013 | Pereira | G06F 3/04845 715/765 |
| 2014/0059499 A1 | 2/2014 | Kim et al. | |
| 2014/0123079 A1 | 5/2014 | Wu | |
| 2014/0132619 A1* | 5/2014 | Landsberger | G06T 11/001 345/589 |
| 2014/0192028 A1 | 7/2014 | Leydon | |
| 2014/0292690 A1 | 10/2014 | Sugihara | |

FOREIGN PATENT DOCUMENTS

| | | |
|---|---|---|
| KR | 10-2014-0082596 A | 7/2014 |
| WO | 2015/051489 A1 | 4/2015 |

OTHER PUBLICATIONS

European Examination Report dated Nov. 4, 2019, issued in European Application No. 16835493.4.

* cited by examiner

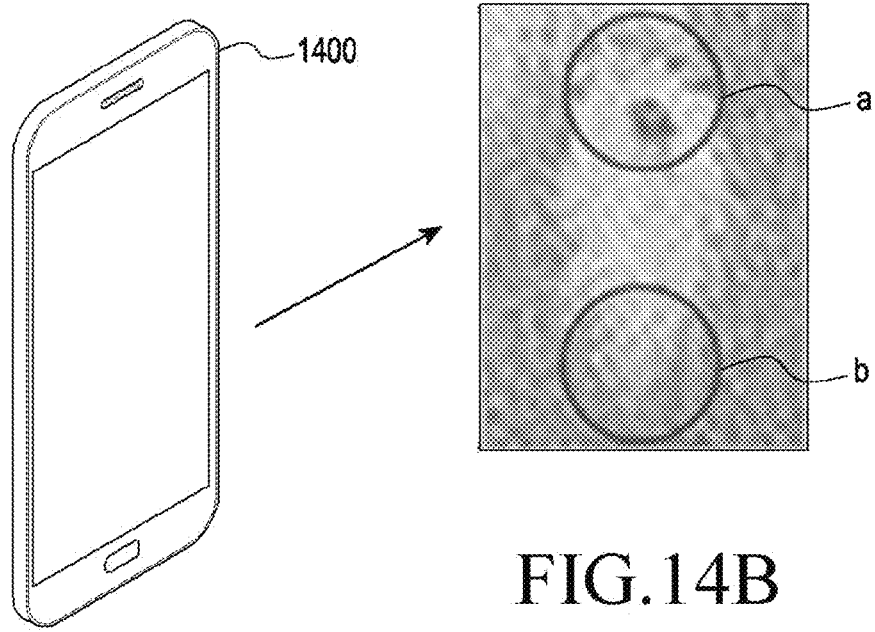
FIG.14A
FIG.14B
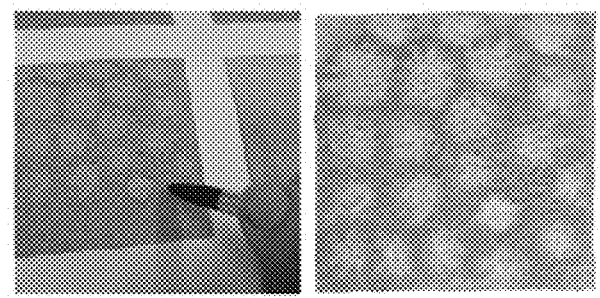
FIG.15A
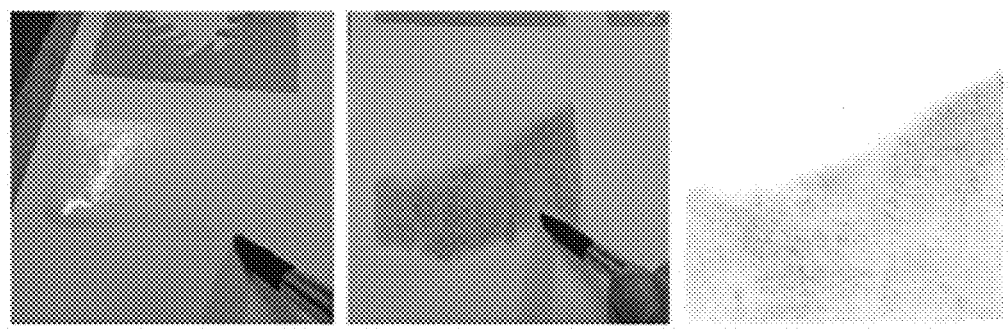
FIG.15B

ELECTRONIC DEVICE AND METHOD FOR CONTROLLING INPUT IN ELECTRONIC DEVICE

CROSS-REFERENCE TO RELATED APPLICATION(S)

This application claims the benefit under 35 U.S.C. § 119(a) of a Korean patent application filed on Aug. 13, 2015 in the Korean Intellectual Property Office and assigned Serial number 10-2015-0114515, the entire disclosure of which is hereby incorporated by reference.

TECHNICAL FIELD

The present disclosure relates to electronic devices and methods for controlling input in electronic devices.

BACKGROUND

A proliferation of smartphones advances interfacing techniques between users and electronic devices, namely, technology in which the electronic devices recognize various user inputs and produce various outputs as the recognized results.

A user of an electronic device equipped with a user input interface, such as a touch panel, may make intuitive entry using an input device (e.g., a stylus pen), as if the user does real-life handwriting on a notebook.

Use of such an input device as a stylus brush allows a drawing to be displayed in different levels of thickness and color darkness.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for controlling input by the same which may, using a stylus brush, present similar watercolor painting effects to those by a real-life brush.

A real-life brush may represent various watercolor painting effects depending on the amount of water it absorbs. Such an electronic device according to the related art, although displaying a drawing in different levels of thickness and color darkness corresponding to an input by the stylus brush, fails to provide such watercolor painting effects as may be achieved using a real-life brush.

In accordance with an aspect of the present disclosure, an electronic device is provided. The electronic device includes a display including a touch panel; a processor electrically connected to the display; and a memory electrically connected with the processor, wherein the memory stores instructions executed to enable the processor to: receive, from the touch panel, first data regarding a time or an area contacted by an external object through a first region on the display, receive, from the touch panel, second data regarding a contact or an approach of the external object to a second region of the display after the external object is spaced apart from the display, and display an image or an image variation on the display based on the first data or the second data.

In accordance with another aspect of the present disclosure, an electronic device is provided. The electronic device includes a display; and a processor functionally connected with the display, the processor configured to: determine a color in which an external object is to be displayed on a first region of the display, determine an attribute of the color based on a time or area of an input of the external object to a second region of the display, and display at least part of an area, in the first region, selected based on the input of the external object using the color having the attribute reflected.

In accordance with another aspect of the present disclosure, an input method in an electronic device is provided. The input method includes receiving, from a touch panel of a display, first data regarding a time or an area contacted by an external object through a first region on the display; receiving, from the touch panel, second data regarding a contact or approach of the external object to a second region of the display after the external object is spaced apart from the display; and displaying an image or an image variation on the display based on the first data or the second data.

In accordance with another aspect of the present disclosure, an electronic device and method for controlling input is provided. The electronic device and method for controlling input includes similar watercolor painting effects to those of a real-life brush by using a stylus brush, presenting a more lifelike user experience together with user convenience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. As the color drawings are being filed electronically via EFS-Web, only one set of the drawings is submitted.

The above and other aspects, features, and advantages of certain embodiments of the present disclosure will be more apparent from the following description taken in conjunction with the accompanying drawings, in which:

FIGS. 14A and 14B are views illustrating an example of adjusting a direction of water spreading on canvas in an electronic device depending on a slope of the electronic device according to an embodiment of the present disclosure;

FIGS. 15A and 15B are views illustrating a wet-on-wet effect and a wet-into-wet effect in an electronic device according to various embodiments of the present disclosure;

Throughout the drawings, like reference numerals will be understood to refer to like parts, components, and structures.

DETAILED DESCRIPTION

Figure 1:
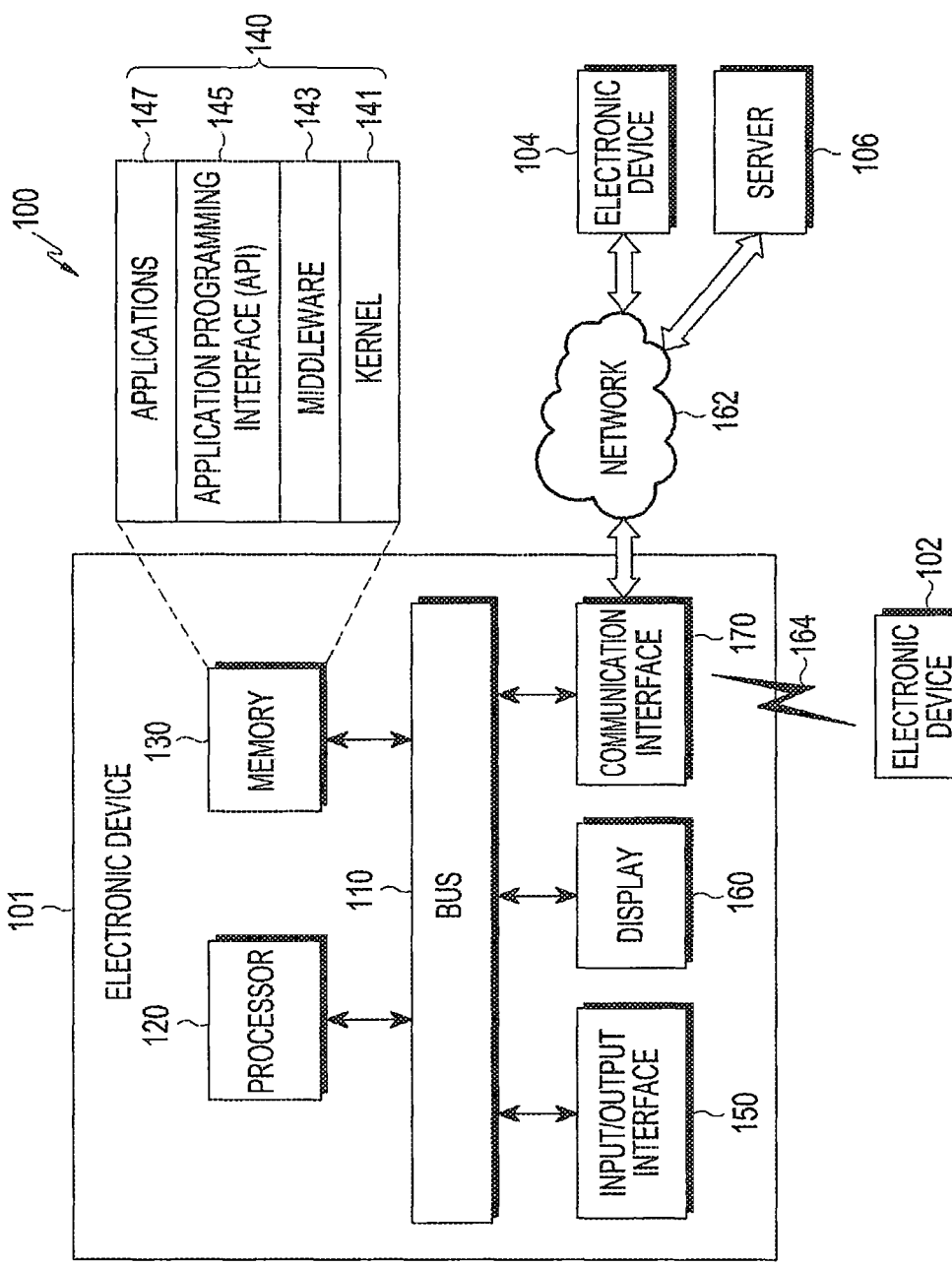
FIG. 1 illustrates a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

As used herein, the terms "have", "may have", "include", or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to", or "connected with/to" another element (e.g., a second element), it may be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for", "having the capacity to", "designed to", "adapted to", "made to" or "capable of" depending on circumstances. The term "configured (or set) to" does not essentially mean "specifically designed in hardware to". Rather, the term "configured to" may mean that a device may perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a", "an", and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 illustrates a network environment according to an embodiment of the present disclosure.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a CPU, an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 145 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of wireless fidelity (Wi-Fi), Bluetooth (BT), near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
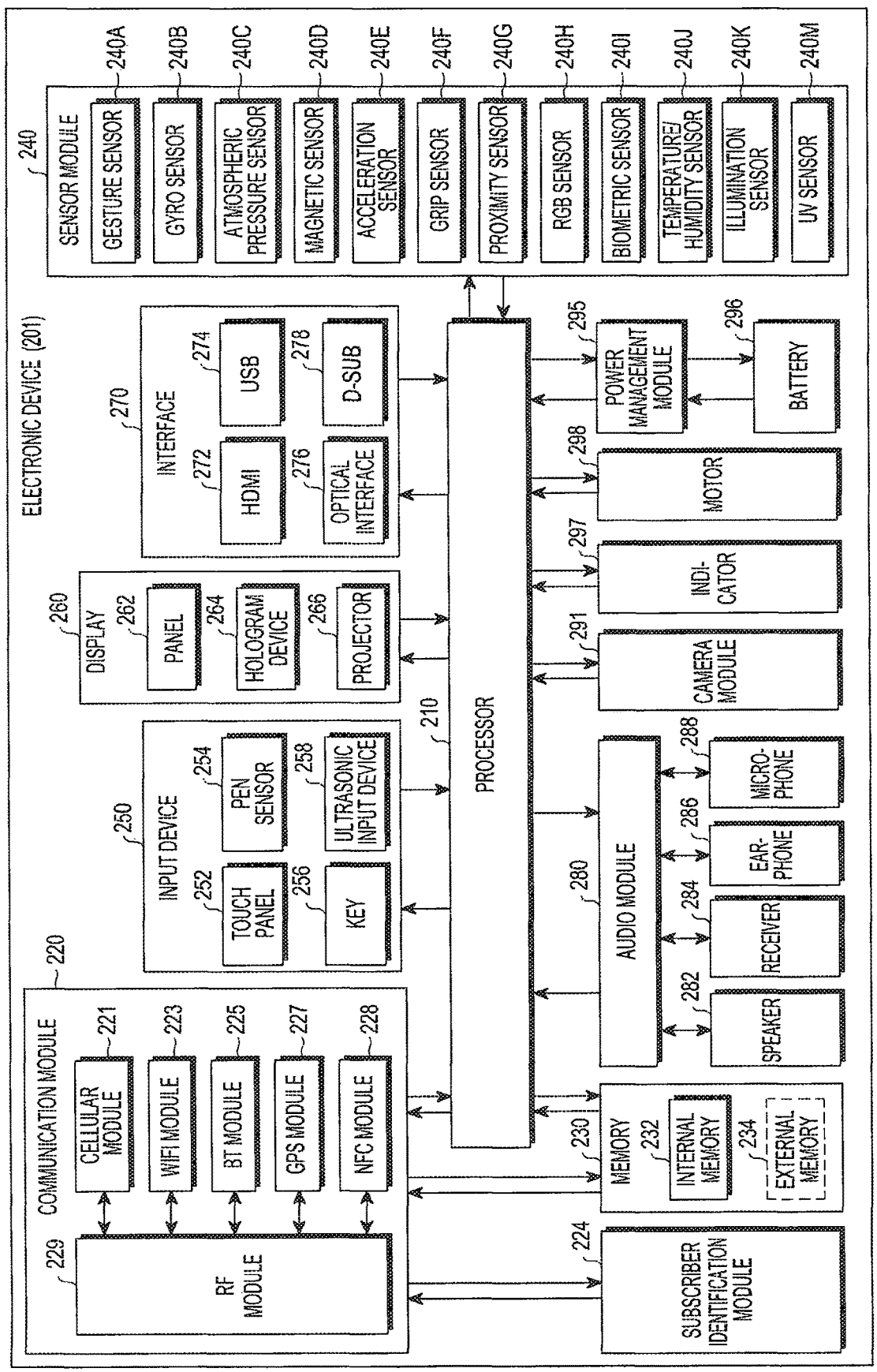
FIG. 2 is a block diagram illustrating an electronic device according to an embodiment of the present disclosure.

FIG. 2 is a block diagram illustrating an electronic device according to an embodiment of the present disclosure.

Referring to FIG. 2, electronic device 201 may include the whole or part of the configuration of, e.g., the electronic device 101 shown in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a Wi-Fi module 223, a BT module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using the subscriber identification module 224 (e.g., the SIM card). According to an embodiment of the present disclosure, the cellular module 221 may perform at least some of the functions provided by the processor 210. According to an embodiment of the present disclosure, the cellular module 221 may include a CP.

The Wi-Fi module 223, the BT module 225, the GNSS module 227, or the NFC module 228 may include a process for, e.g., processing data communicated through the module. According to an embodiment of the present disclosure, at least some (e.g., two or more) of the cellular module 221, the Wi-Fi module 223, the BT module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the BT module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an red-green-blue (RGB) sensor, a bio sensor 240I, a temperature/humidity sensor 240J, an illumination sensor 240K, or an ultra violet (UV) sensor 240M. Additionally or alternatively, the sensing module 240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module.

The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a High Definition Multimedia Interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, an SD card/MMC interface, or infrared data association (IrDA) standard interface.

The audio module 280 may convert a sound into an electric signal or vice versa, for example. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment of the present disclosure, one or more image sensors (e.g., front and back sensors), a lens, an Image signal processor (ISP), or a flash such as an LED or xenon lamp.

The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
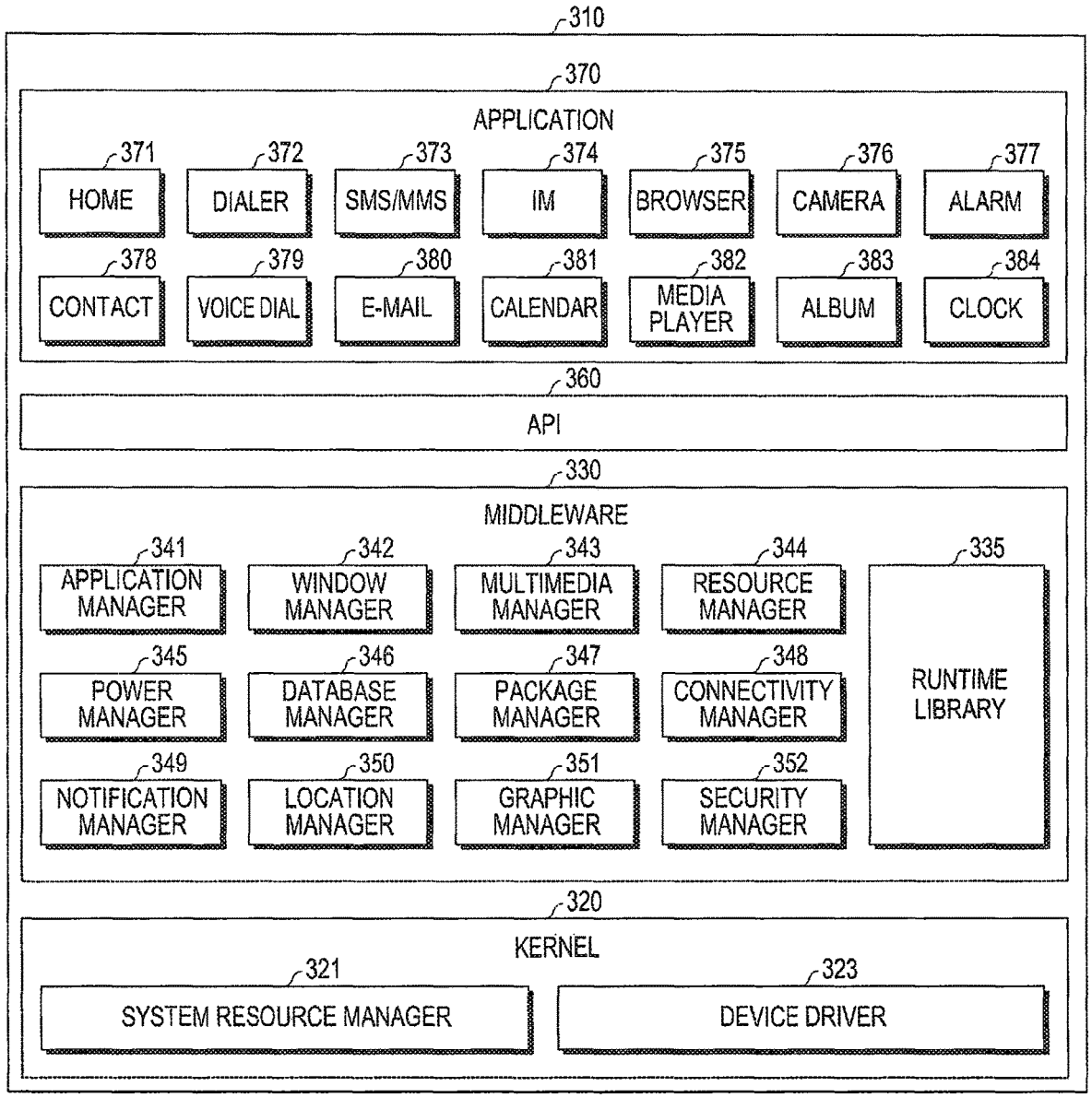
FIG. 3 is a block diagram illustrating a program module according to an embodiment of the present disclosure.

FIG. 3 is a block diagram illustrating a program module according to an embodiment of the present disclosure.

Referring to FIG. 3, a program module 310 (e.g., the program 140) may include an operating system (OS) controlling resources related to the electronic device (e.g., the electronic device 101) and/or various applications (e.g., the application processor 147) driven on the operating system. The operating system may include, e.g., Android, iOS, Windows, Symbian, Tizen, or Bada.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the external electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or BT. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MIMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the external electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the external electronic devices 102 and 104). Further, the notification relay application may receive notification information from, e.g., the external electronic device and may provide the received notification information to the user.

The device management application may perform at least some functions of the external electronic device (e.g., the external electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the external electronic devices 102 and 104). According to an embodiment of the present disclosure, the application 370 may include an application received from the external electronic device (e.g., the server 106 or external electronic devices 102 and 104). According to an embodiment of the present disclosure, the application 370 may include a preloaded application or a third party application downloadable from a server. The names of the components of the program module 310 according to the shown embodiment may be varied depending on the type of operating system.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FP-GAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

Figure 4:
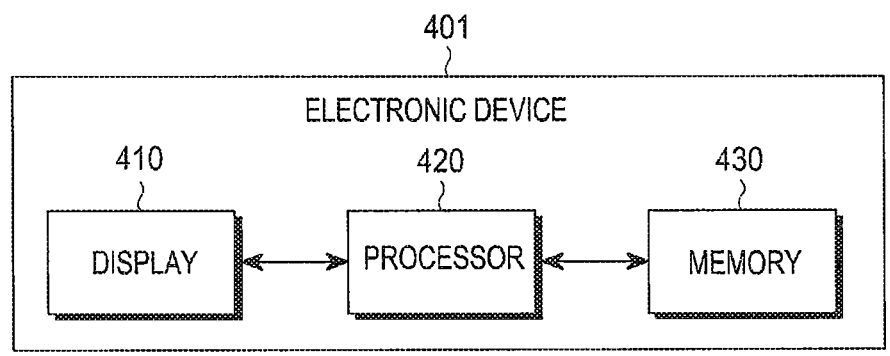
FIG. 4 is a block diagram illustrating an electronic device according to an embodiment of the present disclosure.

FIG. 4 is a block diagram illustrating an electronic device according to an embodiment of the present disclosure.

Referring to FIG. 4, an electronic device 401 may be substantially the same as the electronic device 101 shown in FIG. 1. Referring to FIG. 4, the electronic device 401 may include, e.g., a display 410, a processor 420, and a memory 430.

According to an embodiment of the present disclosure, the display 410 may be, e.g., the display 160 shown in FIG. 1. The display 410 may be a touchscreen display. The touchscreen display may include a touch panel capable of recognizing a touch using an external object (e.g., an input device (e.g., a stylus pen or stylus brush) or a body portion of a human being).

Figure 5A:
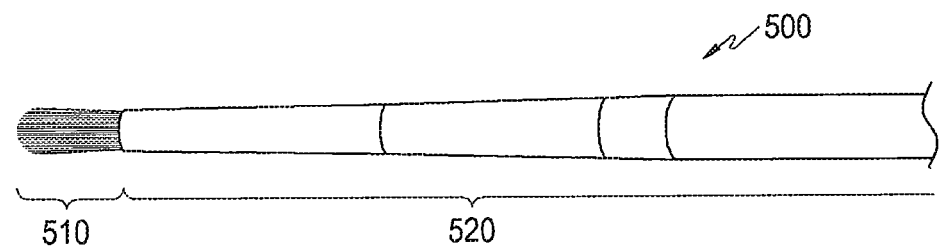
FIGS. 5A and 5B are views illustrating various configurations of a stylus brush according to various embodiments of the present disclosure.
Figure 5B:
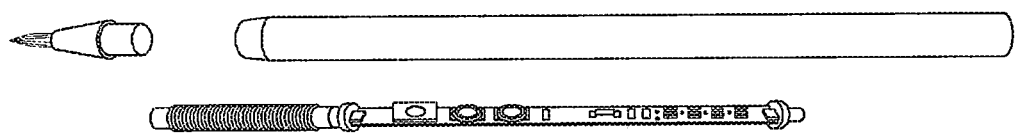

FIGS. 5A and 5B are views illustrating various configurations of a stylus brush according to various embodiment of the present disclosure.

Referring to FIGS. 5A and 5B, a stylus brush 500 includes a contact portion 510 and a body portion 520. The contact portion 510 is formed of multiple elastic fibers with unique conductance. The contact portion 510, when contacting or approaching the touch panel, induces an electromagnetic field. The contact portion 510 may be formed of other materials than carbon fiber. The stylus brush 500 may further include a resonating body (e.g., a Wacom™ pen) as shown in FIG. 5B.

Figure 6:
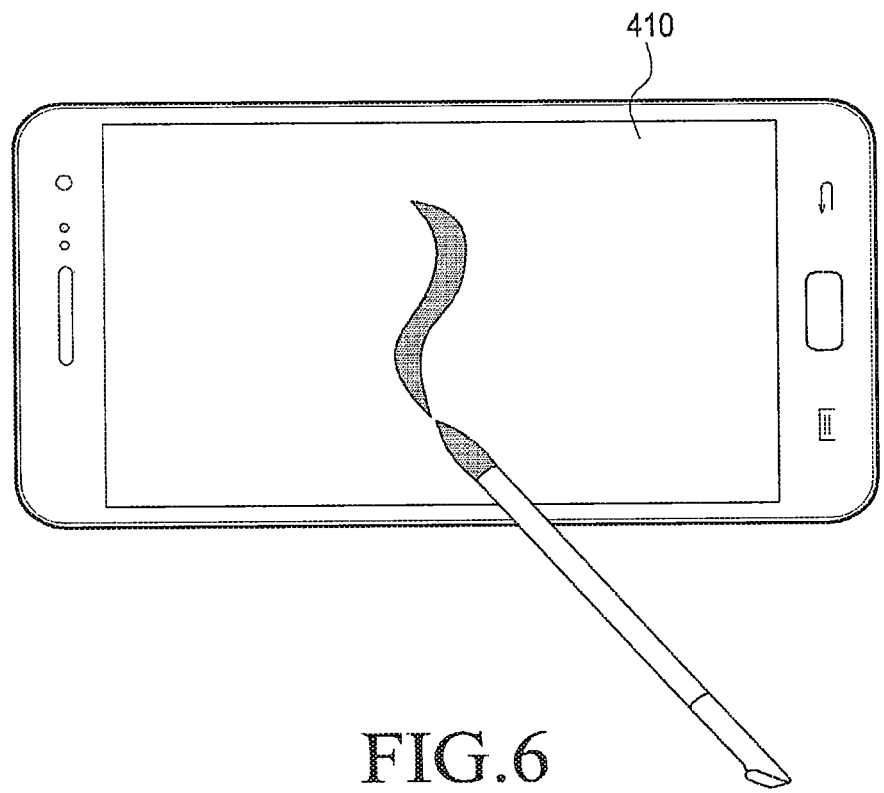
FIG. 6 is a view illustrating a display capable of recognizing an input by a stylus brush according to an embodiment of the present disclosure.

FIG. 6 is a view illustrating a display capable of recognizing an input by a stylus brush according to an embodiment of the present disclosure.

Referring to FIG. 6, the display 410 may include a touch panel capable of recognizing a conducting object or resonating body of the stylus brush.

According to an embodiment of the present disclosure, the display 410 may detect data regarding an input (contact or approach) of the stylus brush and transmit the detected data to the processor 420.

According to an embodiment of the present disclosure, the touch panel of the display 410, when contacted by the stylus brush, may detect the strength, area (width and height), and coordinates of the region where the stylus brush contacts and provide to the processor 420.

According to an embodiment of the present disclosure, the touch panel of the display 410 may transmit first data related to the time or area of the contact of the stylus brush to a first data region to the processor 420 while displaying a UI for a drawing. For example, the first data region may include an image representing a bucket on the UI.

According to an embodiment of the present disclosure, the touch panel of the display 410 may transmit second data related to a contact of the stylus brush to a second data region, after contacting the first data region, to the processor 420 while displaying the UI for the drawing. For example, the second data region may include an image representing the texture of canvas or paper on the UI.

According to an embodiment of the present disclosure, the processor 420 may be the processor 120 shown in FIG. 1. The processor 410 may include, e.g., a hardware module, a software module, a firmware module, or a combination of two or more thereof.

According to an embodiment of the present disclosure, the processor 420 may determine the type of an input device using data regarding an input (contact or approach) of the input device inputted (contacting or approaching) to the display 410.

According to an embodiment of the present disclosure, the processor 420 may determine the type of the input device base on at least one of the coordinates, signal strength and area received from the display 410.

According to an embodiment of the present disclosure, the processor 420 may adjust the amount of water in the contact portion of the stylus brush to provide a watercolor painting effect.

According to an embodiment of the present disclosure, the processor 420 may adjust the amount of water in the contact portion of the stylus brush based on at least one of the type or material of the stylus brush, distance between the display 410 and the stylus brush, input time of the stylus brush or input speed of the stylus brush. The processor 420 may provide a watercolor painting effect to the image with the canvas or paper texture on the display 410 based on the input of the contact portion with the water amount adjusted.

According to an embodiment of the present disclosure, the processor 420 may detect the material and type (size and shape of the contact portion) of the stylus brush based on at least one of the coordinates, signal strength and area received from the display 410 and detect a preset amount of water corresponding to at least one of the detected type and material of the stylus brush.

Figure 7:
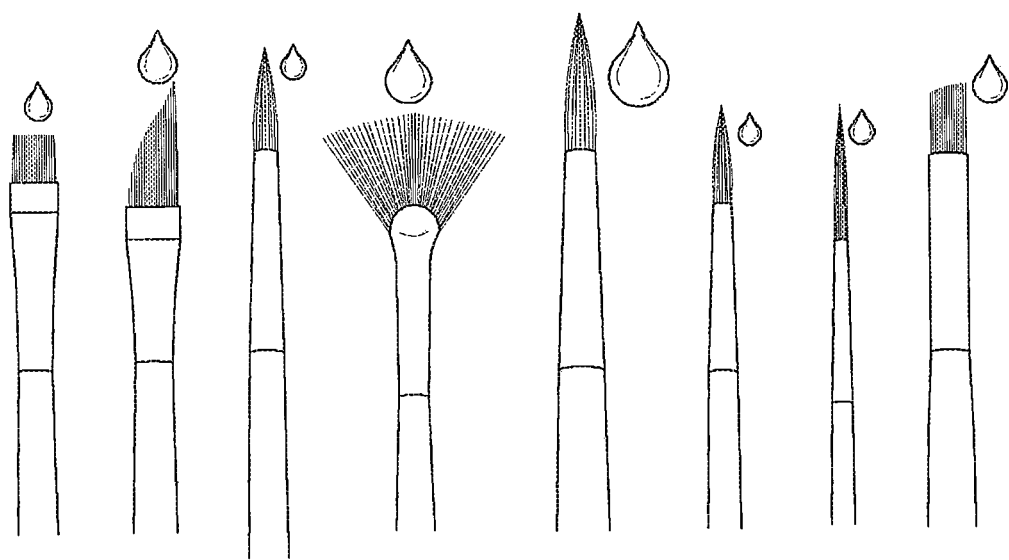
FIG. 7 is a view illustrating an example of adjusting the amount of water depending on the type and material of a stylus brush in an electronic device according to an embodiment of the present disclosure.

FIG. 7 is a view illustrating an example of adjusting an amount of water depending on a type and material of a stylus brush in an electronic device according to an embodiment of the present disclosure.

Referring to FIG. 7, the amount of water soaked in the contact portion of the stylus brush may be adjusted depending on the type of the stylus brush inputted to the display 410 by previously defining the amount of water in the contact portion of the stylus brush depending on the type of the stylus brush.

According to an embodiment of the present disclosure, the processor 420 may divide the contact portion of the stylus brush into a plurality of regions based on the distance between the display 410 and the stylus brush and may adjust the amount of water in the regions so that more water is in regions closer to the display 410 while less water is in regions away farther from the display 410.

Figure 8A:
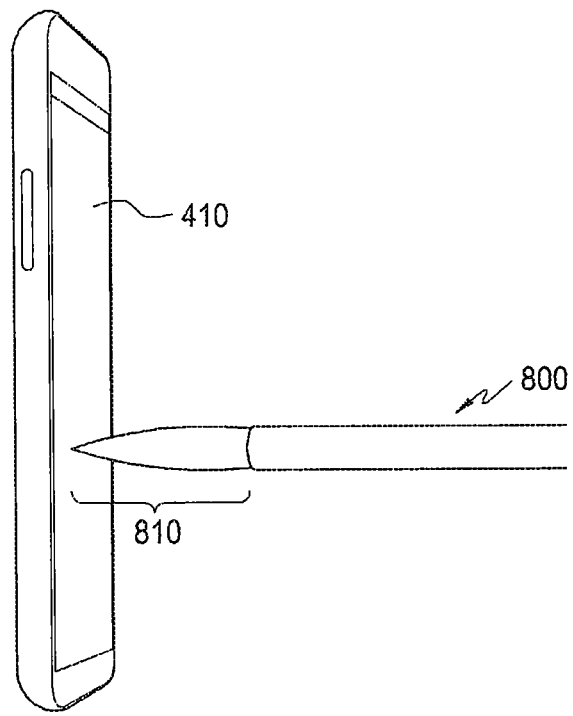
FIGS. 8A and 8B are views illustrating examples of adjusting an amount of water depending on a distance between a display and a stylus brush in an electronic device according to various embodiments of the present disclosure.
Figure 8B:
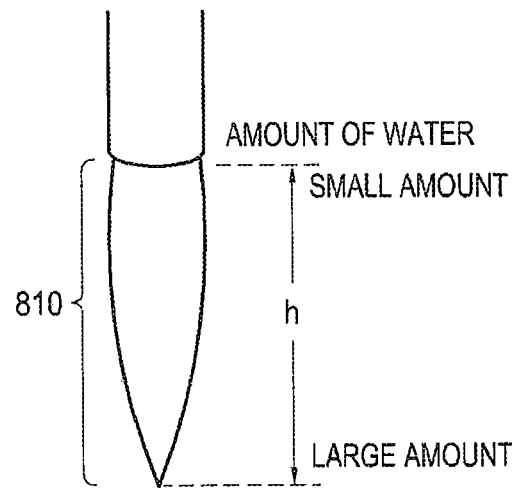

FIGS. 8A and 8B are views illustrating examples of adjusting an amount of water depending on a distance between a display and a stylus brush in an electronic device according to various embodiments of the present disclosure.

Referring to FIGS. 8A and 8B, while a stylus brush 800 remains contacting the display 410, the processor 420 may adjust the amount of water so that a tip of a contact portion 810 of the stylus brush, which is close to the display 410, has the most water while a portion of the contact portion 810 away from the display 410 has the least water. The processor 420 may adjust the amount of water in the contact portion of the stylus brush to vary depending on at least one of the input time or input speed of the stylus brush having the amount of water adjusted in the contact portion 810.

According to an embodiment of the present disclosure, while displaying the UI for drawing, the processor 420 may enable the contact portion of the stylus brush to add water through a particular region in the UI for adding water and the contact portion to have less water through another particular region in the UI for reducing water.

Figure 9:
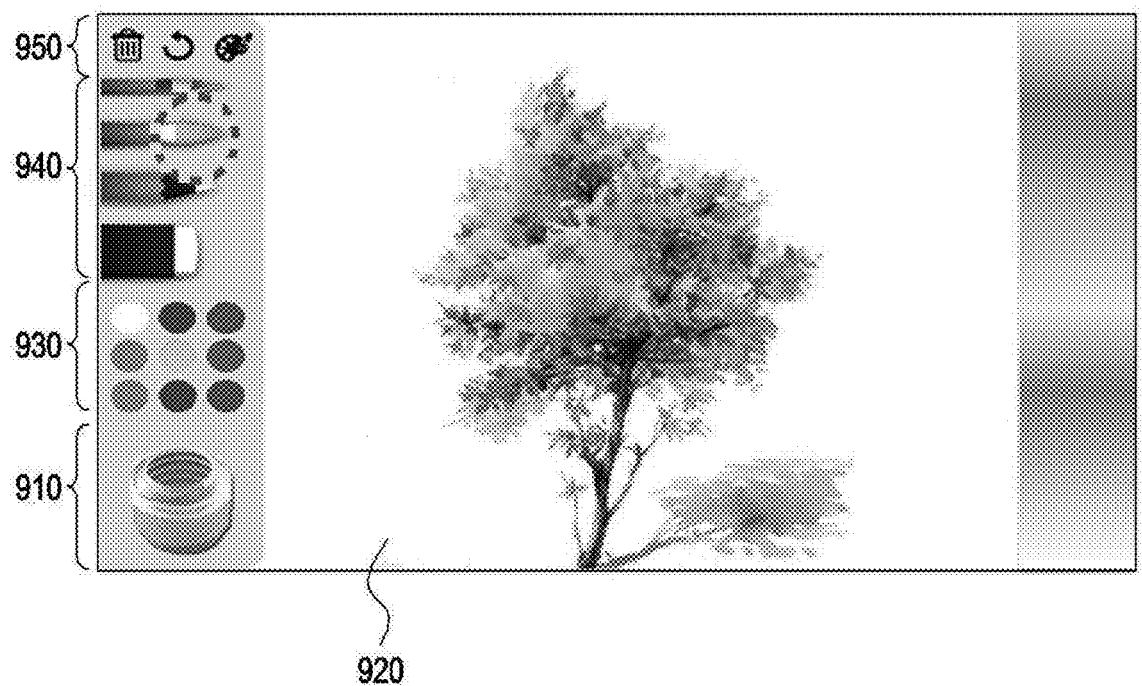
FIG. 9 is a view illustrating an example of adjusting an amount of water through a user interface (UI) in an electronic device according to an embodiment of the present disclosure.

FIG. 9 is a view illustrating an example of adjusting an amount of water through a user interface (UI) in an electronic device according to an embodiment of the present disclosure.

Referring to FIG. 9, a UI for drawing includes a first region 910 displaying a bucket image, a second region 920 including an image representing the texture of canvas or paper to display a drawing, a third region 930 displaying the type of colors, a fourth region 940 displaying the type of input devices, and a fifth region 950 displaying particular functions. The processor 420 may adjust the contact portion of the stylus brush to increase to a predetermined amount of water depending on attributes, e.g., the duration, count, and pressure of contact of the stylus brush to the first region 910. When the stylus brush contacts a particular icon (not shown), a region other than the inlet of the bucket in the bucket image in the first region 910, or an edge region of the UI, the processor 420 may adjust the contact portion of the stylus brush to reduce to a predetermined amount of water depending on attributes, e.g., the duration, count, and pressure of contact of the stylus brush. Further, the processor 420 may display an image corresponding to the type of the stylus brush recognized automatically or by the user's settings on the UI, e.g., a stylus brush icon, and may display the amount of water currently set for the contact portion of the stylus brush on the stylus brush icon, so that it can be visually identified by the user.

According to an embodiment of the present disclosure, the processor 420 may provide a dropping effect depending on the amount of water set for the contact portion of the stylus brush. The processor 420 may compare the amount of water set for the contact portion of the stylus brush with a threshold and provide such a dropping effect as if water drops onto the display depending on the result of comparison.

Figure 10A:
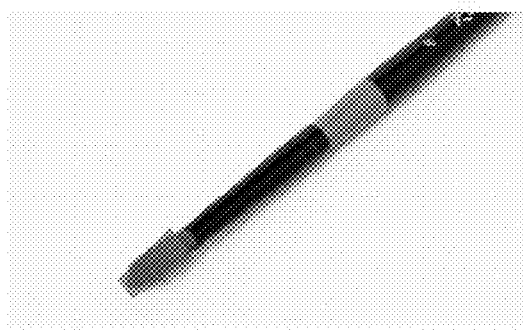
FIGS. 10A and 10B are views illustrating examples of providing a dropping effect depending on an amount of water of a stylus brush in an electronic device according to various embodiments of the present disclosure.
Figure 10B:
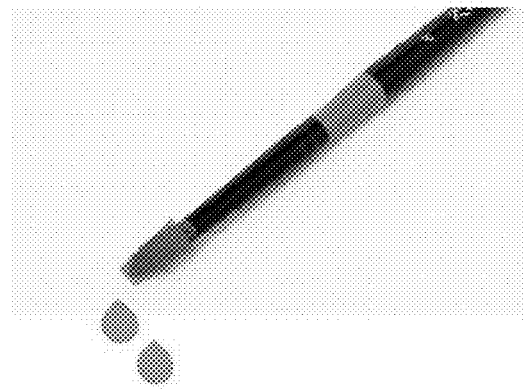

FIGS. 10A and 10B are views illustrating examples of providing a dropping effect depending on an amount of water of a stylus brush in an electronic device according to various embodiments of the present disclosure.

Referring to FIGS. 10A and 10B, when the amount of water in the contact portion of the stylus brush is not more than the threshold, the dropping effect is not provided. As shown in FIG. 10B, when the amount of water in the contact portion of the stylus brush is not less than the threshold, such a dropping effect as if a water drip falls and spreads on the display 410. For example, when the amount of water in the contact portion of the stylus brush is not less than the threshold through a contact to the image representing the bucket in the first region on the UI as shown in FIG. 9, such a water dropping effect corresponds to the amount of water in the contact portion of the stylus brush may be displayed on the display 430.

The processor 420 may enable the amount and speed of water dropping to vary depending on the amount of water set for the contact portion of the stylus brush, and the processor 420 may enable the water to drop more quickly and spread on the canvas of the display as the amount of water increases. The processor 420 may keep providing the dropping effect until the amount of water set for the contact portion of the stylus brush reduces down to a particular threshold as the water drops.

According to an embodiment of the present disclosure, the processor 420 may provide a watercolor painting effect by adjusting the amount of water in the image with canvas or paper texture on the display 410.

According to an embodiment of the present disclosure, the processor 420 may adjust the amount of water in the canvas based on at least one of the type of canvas, position in the canvas where the stylus brush contacts, type of the brush, and distance between the display and the brush. The processor 420 may provide a watercolor painting effect to the canvas or paper texture of image depending on the input of the stylus brush contacting the water amount-adjusted canvas.

According to an embodiment of the present disclosure, the processor 420 may adjust the amount of water depending on the material of the canvas displayed on the display 410, and the amount of water may be previously defined depending on the type (material) of the canvas. For example, the processor 420 may adjust the amount of water to decrease when the canvas is of a type of paper with good absorption and to increase when the canvas is of a type of paper with poor absorption.

Figure 11:
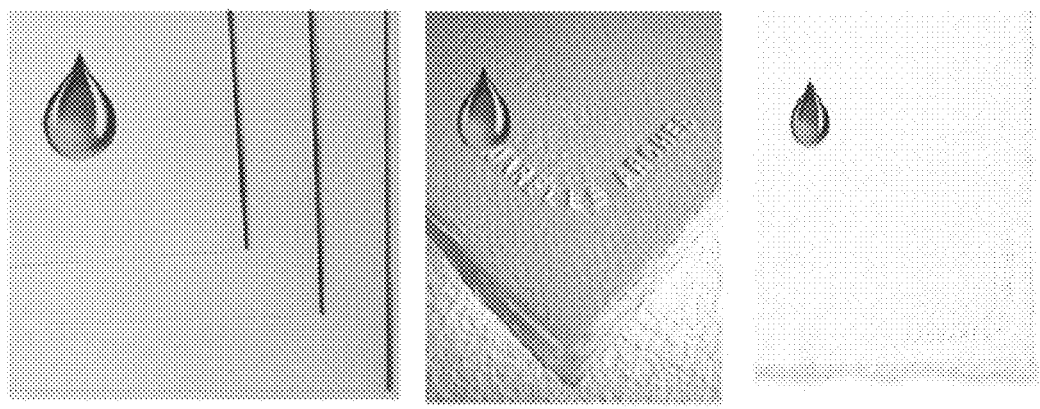
FIG. 11 is a view illustrating an example of adjusting an amount of water depending on a type of canvas in an electronic device according to an embodiment of the present disclosure.

FIG. 11 is a view illustrating an example of adjusting an amount of water depending on a type of canvas in an electronic device according to an embodiment of the present disclosure.

Referring to FIG. 11, the display 410 may display various types of canvas, and an adjustment may be made to a pre-defined amount of water depending on the type of canvas.

According to an embodiment of the present disclosure, the processor 420 may adjust the amount of water depending on the position of the canvas displayed on the display 410, and the amount of water may be previously defined depending on the position of the canvas. When different amounts of water are set depending on the position of the canvas, the processor 420 may detect the position of the canvas contacted by the stylus brush and adjust the amount of water corresponding to the detected position to provide a watercolor painting effect.

Figure 12:
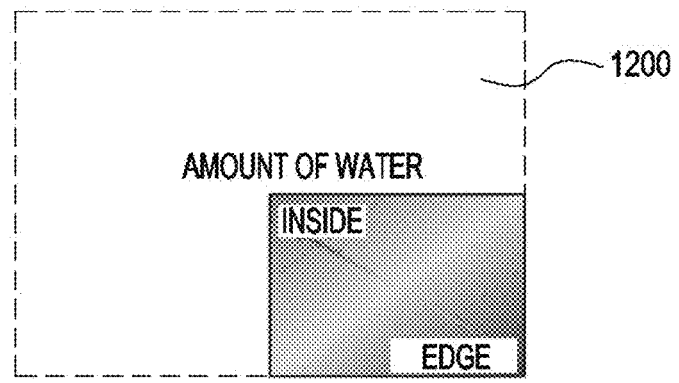
FIG. 12 is a view illustrating an example of adjusting an amount of water depending on the type of canvas in an electronic device according to an embodiment of the present disclosure.

FIG. 12 is a view illustrating an example of adjusting an amount of water depending on a type of canvas in an electronic device according to an embodiment of the present disclosure.

Referring to FIG. 12, such a setting may be made so that the amount of water increases to an inside of canvas 1200 while it decreases to the edge of the canvas 1200.

According to an embodiment of the present disclosure, the processor 420 may adjust the amount of water depending on additives, type of color, type of stylus brush, and type of canvas. For example, when an additive, such as alcohol or glycerin, is displayed on the UI as shown in FIG. 9, the amount of water and speed of water evaporation may be adjusted by the operation of mixing the additive with the color. Further, the processor 420 may adjust the amount of water and the speed of water evaporation depending on the type of color, type of stylus brush, type or position of canvas, distance between the display 410 and the brush, and set values.

According to an embodiment of the present disclosure, the processor 420 may provide such a watercolor painting effect as if water spreads on the canvas or paper texture of image on the display 410. Such a water spreading effect may apply to a water-diluted color as well as water.

According to an embodiment of the present disclosure, the processor 420 may adjust the amount of water spreading on the canvas based on at least one of the type or material of canvas, material of the brush, distance between the display 410 and the brush or the slope of the electronic device. The processor 420 may provide a water-spreading watercolor painting effect to the canvas or paper texture of image depending on the input of the stylus brush contacting the canvas with the amount of water spreading adjusted.

Figure 13:
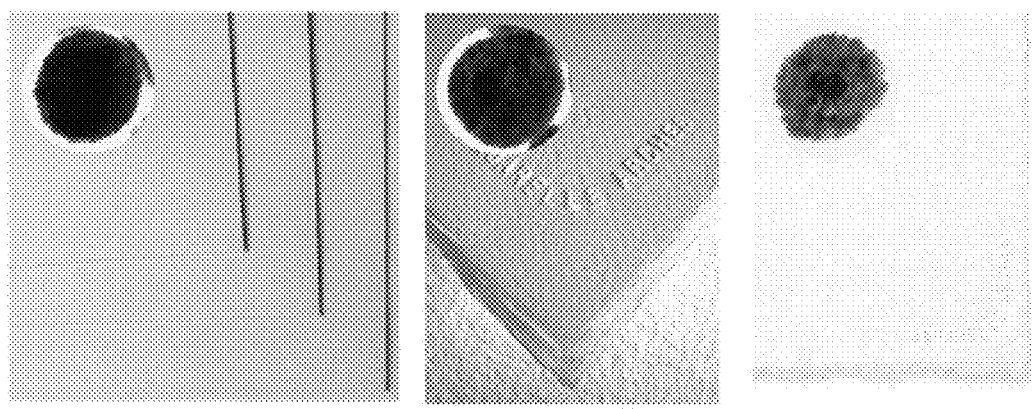
FIG. 13 is a view illustrating an example of adjusting an amount of water spreading on canvas in an electronic device according to an embodiment of the present disclosure.

FIG. 13 is a view illustrating an example of adjusting an amount of water spreading on a canvas in an electronic device according to an embodiment of the present disclosure.

Referring to FIG. 13, the display 410 may display various types of canvas, and an adjustment may be made to a pre-defined amount of water spreading depending on the type of canvas.

According to an embodiment of the present disclosure, the processor 420 may adjust the amount of water spreading on the canvas according to a movement of the electronic device. The processor 420 may determine the slope of the electronic device using a motion sensor, e.g., a gyro sensor, equipped in the electronic device and may change the direction of water spreading on the canvas depending on the slope of the electronic device.

FIGS. 14A and 14B are views illustrating an example of adjusting a direction of water spreading on canvas in an electronic device depending on a slope of the electronic device according to an embodiment of the present disclosure.

Referring to FIGS. 14A and 14B, when an electronic device 1400 at the position where it is viewed by the user is inclined in an opposite direction of the user's position as shown in FIG. 14A, the water spreading effect may be provided on the canvas in a direction where the electronic device 1400 is inclined as shown in FIG. 14B. As shown in FIG. 14B, more water may be displayed in a portion of the canvas corresponding to the direction in which the electronic device 1400 is inclined, and less water may be displayed in a portion (b) of the canvas not corresponding to the direction of the inclination of the electronic device 1400.

According to an embodiment of the present disclosure, the processor 420 may provide a wet-on-wet and wet-into-wet effect, sponge effect, hatching scheme effect, splatter effect, salt scheme effect, overlapping effect, and dry brush effect to the canvas or paper texture of image on the display 410.

According to an embodiment of the present disclosure, when the canvas is overcoated with water or color by an input of the stylus brush, and before a predetermined time elapses, e.g., before the water or color on the canvas is not dried yet, it is overcoated with water or color, the processor 420 may provide the wet-on-wet and wet-into-wet effect to the canvas considering the amount of water evaporating and spreading according to the type and position of the canvas and the amount of water evaporating and spreading according to the type of brush and distance between the display and the brush. The processor 420 may perform lifetime control on the effects according to the amount of water set for the brush and a particular position on the canvas. As the form of the basic vector complies with the shape (e.g., circular, elliptical, or rectangular) of the contact portion of the brush, the processor 420 may correct the vector value depending on the direction, speed, and strength of the movement of the brush. For example, the processor 420 may enable more spreading to occur in an opposite direction of the moving direction of the brush, as the speed decreases, or as the strength increases.

FIGS. 15A and 15B are views illustrating a wet-on-wet effect and wet-into-wet effect in an electronic device according to various embodiments of the present disclosure.

Referring to FIGS. 15A and 15B, the canvas, when overcoated with water or color through an input of the brush, may be provided with a wet-into-wet effect as shown in FIG. 15A and a wet-on-wet effect as shown in FIG. 15B, considering the amount of water evaporating and spreading according to the type and position of the canvas and the amount of water evaporating and spreading according to the type of brush and the distance between the display and the brush.

According to an embodiment of the present disclosure, the processor 420 may provide a sponge effect to the canvas depending on the amount of water at a particular position on the canvas and the amount of water set for the contact portion of the stylus brush or an input device corresponding to a separate sponge tool. The processor 420 may perform control to represent the strength of the sponge effect depending on the height of the brush or input device corresponding to various types of sponge tools with different surface textures. The processor 420 may measure the amount of water (color) at a particular position on the canvas and measure the amount of water (color) of the input device corresponding to the sponge tool. When the input device corresponding to the sponge tool or the brush contacts the particular position on the canvas, the processor 420 may compare the amount of water in the brush or input tool with the amount of water at the particular position on the canvas and provide such a sponge effect that the water (color) moves/spreads in a direction where less water is present. The processor 420 may correct the vector value of the movement/spread depending on the direction, speed, and strength of the movement of the brush or input device corresponding to the sponge tool. For example, the processor 420 may enable more spreading to occur in an opposite direction of the moving direction of the brush, as the speed decreases, or as the strength increases.

Figure 16:
FIG. 16 is a view illustrating a sponge effect in an electronic device according to an embodiment of the present disclosure.

FIG. 16 is a view illustrating a sponge effect in an electronic device according to an embodiment of the present disclosure.

Referring to FIG. 16, a sponge effect may be presented on the canvas, by adjusting the amount of water in the contact portion of the brush and the amount of water at the particular position on the canvas.

According to an embodiment of the present disclosure, the processor 420 may provide such a hatching scheme effect that, depending on the area where the contact portion of the stylus brush contacts and the direction of the contact portion only a predetermined portion of the canvas overcoated with water (color) is scratched out or left with the rest scratched out using an input device having a hard and sharp tip, such as a cutter, to present a bright feel. The processor 420 may measure the alpha value of the particular position on the canvas and adjust the alpha value at the particular position on the canvas depending on the pressure of the brush. The processor 420 may recognize the direction of the contact portion of the brush and tip of the contact portion of the brush and adjust the alpha value to increase as the contact is made more by the tip of the contact portion of the brush. The processor 420 may vary and display a basic hatching area (e.g., trapezoid or parallelogram) depending on the type of a scratcher-style (e.g., cutter or piece of plastic) input device other than the brush.

Figure 17:
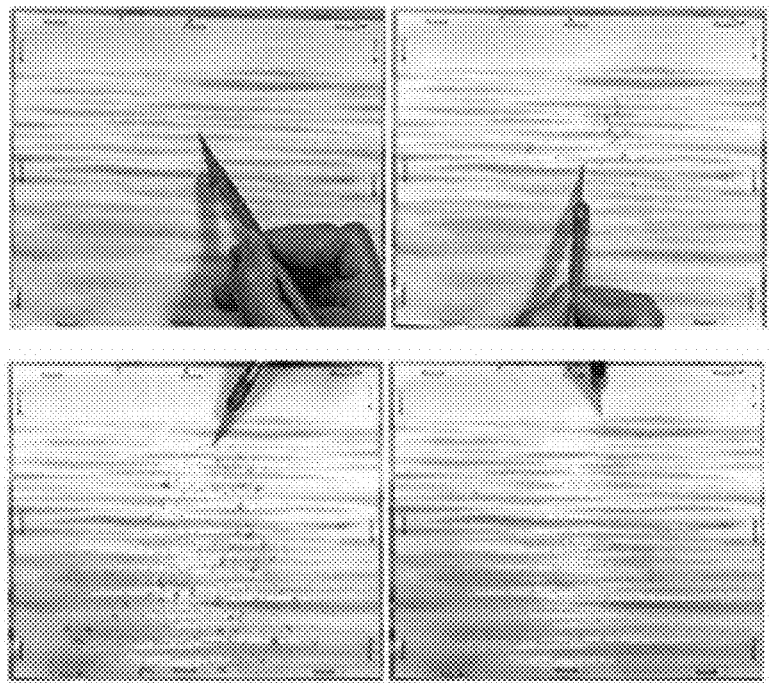
FIG. 17 is a view illustrating a hatching scheme effect in an electronic device according to an embodiment of the present disclosure.

FIG. 17 is a view illustrating a hatching scheme effect in an electronic device according to an embodiment of the present disclosure.

Referring to FIG. 17, a hatching scheme effect may be presented to the canvas, depending on the area where the contact portion of the stylus brush contacts and the direction of the contact portion.

According to an embodiment of the present disclosure, the processor 420 may provide a splatter effect to the canvas based on information on the height, trajectory, and speed of the stylus brush. The processor 420 may create and represent a random splatter marker based on the information on the height, trajectory, and speed of the brush. In particular, splatter masking may allow a region to be selected through a splatter scheme and be erased thereafter, so that a predetermined region is not colored. The processor 420 may adjust the amount or degree of spread depending on the speed and variations in pressure or hovering of the brush. As the user presses and flicks the input device for splatter or brush on the canvas, the splatter effect may be presented on the canvas. The processor 420 may increase the amount spreading in proportion to the variation in pressure or hovering of the brush. The processor 420 may determine the amount spreading according to an initial maximum (max) pressure value (e.g., in the state flicking) and then change the amount spreading according to the variation in the flicking strength, speed, and trajectory of the brush. The processor 420 may enable more spreading to occur for a longer flick and less spreading for a shorter flick, and the processor 420 may enable it to spread more at the outside of the trajectory as the trajectory varies.

Figure 18:
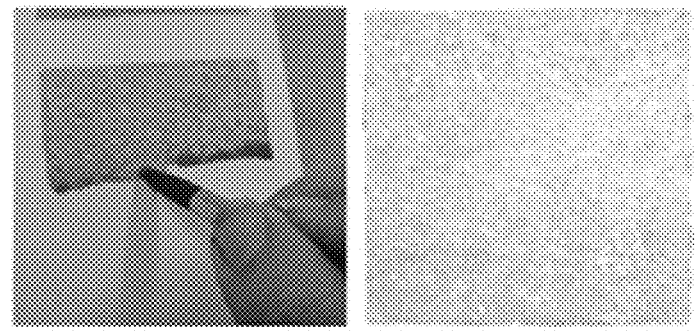
FIG. 18 is a view illustrating a splatter effect in an electronic device according to an embodiment of the present disclosure.

FIG. 18 is a view illustrating a splatter effect in an electronic device according to an embodiment of the present disclosure.

Referring to FIG. 18, a splatter effect may be provided to the canvas as shown in FIG. 18, based on information on the height, trajectory, and speed of the stylus brush.

According to an embodiment of the present disclosure, the processor 420 may provide a salt effect to the canvas based on information on the height, direction, and speed of the stylus brush. In the operation of the brush or user's body portion (e.g., a hand) corresponding to selecting an icon corresponding to salt from a tool for the salt effect and spreading the salt, the processor 420 may adjust the amount and size of salt displayed on the canvas depending on the height, direction, and speed of the brush or body portion. The size of a salt lump displayed on the canvas may be set to a fixed or random value, and the amount of water absorbed by the salt and basic size may also be designated. The processor 420 may make such a display that the strength of absorbing/repelling ambient water varies depending on the size of the salt lump.

The processor 420 may make such a display that a fixed or random amount of salt is irregularly spread when a predetermined region of the canvas is rubbed by the brush or a separate accessory. The processor 420 may make such a display that more and smaller salt lumps may be spread more as random spreading accelerates and fewer while larger salt lumps may be spread less as random spreading decelerates.

Figure 19:
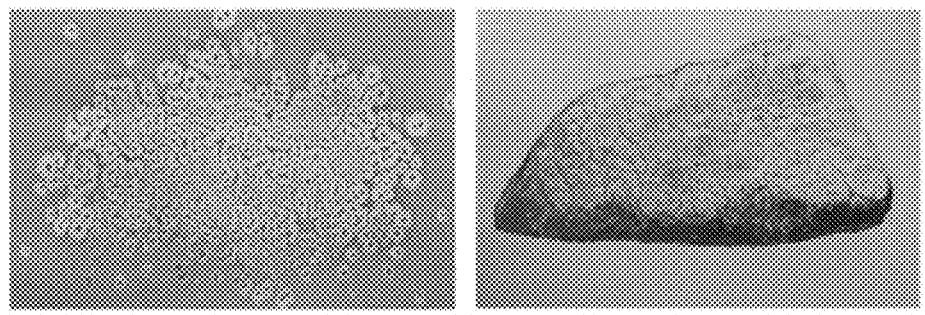
FIG. 19 is a view illustrating a salt effect in an electronic device according to an embodiment of the present disclosure.

FIG. 19 is a view illustrating a salt effect in an electronic device according to an embodiment of the present disclosure.

Referring to FIG. 19, a salt effect may be provided to the canvas as shown in FIG. 19, based on information on the height, direction, and speed of the stylus brush.

According to an embodiment of the present disclosure, the processor 420 may provide an overlapping effect according to areas where colors overlap on the canvas. When a closed loop or overcoat occurs on the canvas upon performing a bitmap operation by common alpha value adjustment, the color may function as an add function and may be thus represented too dark, rendering it different from a real color-mixing feel. The processor 420 may allow colors with similar concentrations with respect to the closed loop along its outline to have the mean value or value considering the value of the first color coat, rather than functioning as the add operation, producing a natural overlapping effect. The processor 420 may measure the similarity in color value between overlapping regions on the canvas, and when the measured similarity is not less than a particular threshold, compute the size of the overlapping regions. The processor 420 may obtain a mask having a predetermined ratio through the size of the overlapping regions and allow the inside of the mask to have a value considering the value of the added color, the existing value of the first coat, or the mean value, but not the alpha sum, thereby eliminating awkwardness. For example, when the value of the first color coat is 80, and the value of the added color is about 90, i.e., a difference of 10 or more or less, the processor 420 may determine that they have a similarity under such a difference and detect and apply a value of 85 (mean value) or more or less, not 80+90, i.e., 170.

Figure 20:
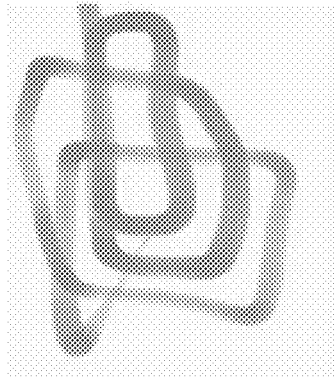
FIG. 20 is a view illustrating an overlapping effect in an electronic device according to an embodiment of the present disclosure.
Figure 20:
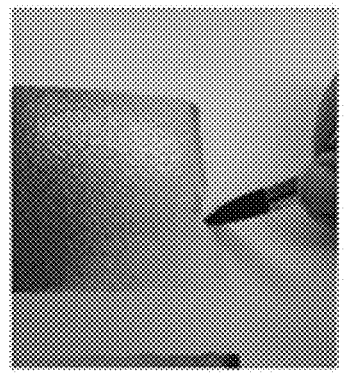
Figure 20:
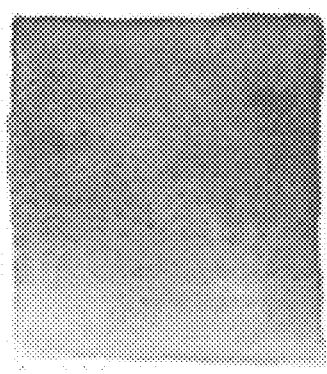

FIG. 20 is a view illustrating an overlapping effect in an electronic device according to an embodiment of the present disclosure.

Referring to FIG. 20, an overlapping effect may be provided to the canvas based on the region where the colors overlap on the canvas as shown in FIG. 20.

According to an embodiment of the present disclosure, the processor 420 may provide a dry brush effect depending on the contact portion of the stylus brush. The processor 420 may provide such a dry brush effect as to represent a rough feel without a single drop of water in the brush in a scheme of using pure color not mixed with water, rather than the common type of colors used in existing painting programs by using a mask in the contact portion of the brush or simulating a predetermined amount of bristle. The processor 420 may provide such a dry brush effect without particularly setting a dry brush mode or when the sum of the amount of water in the canvas and the amount of water in the contact portion of the brush is not more than a predetermined threshold. When randomly generating a per-region empty space using a region mask to simulate the bristles, the processor 420 may generate a predetermined amount of bristles that do not contain water and so cannot perform painting among the bristles, providing a dry brush effect. As the speed or strength (pressure) of input of the brush decreases or the stroke of the brush lengthens, more empty spaces in the mask and more bristles may be displayed.

Figure 21:
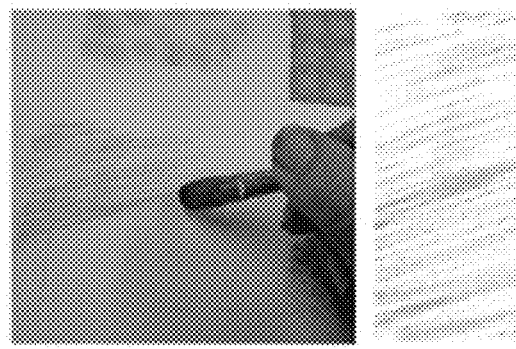
FIG. 21 is a view illustrating a dry brush effect in an electronic device according to an embodiment of the present disclosure.
Figure 21:
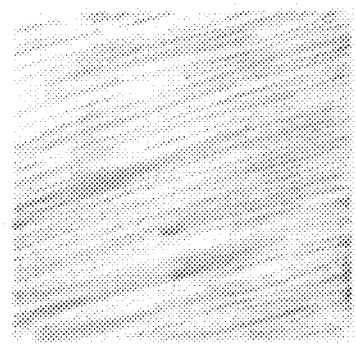

FIG. 21 is a view illustrating a dry brush effect in an electronic device according to an embodiment of the present disclosure.

Referring to FIG. 21, a dry brush effect may be provided to the canvas based on the contact portion of the stylus brush.

According to an embodiment of the present disclosure, the processor 420 may display a drawing corresponding to a color on the canvas while receiving an input of the stylus brush based on the color determined for displaying a first region and the attribute of the color determined based on the time or area where the stylus brush is inputted to a second region.

According to an embodiment of the present disclosure, the processor 420 may divide the screen of the display 410 into a first to third region and may display an object, e.g., an image with a canvas or paper texture, where drawing may be performed by the brush, on at least a portion of the first region, an object, e.g., a bucket image, where water may be adjusted, on the second region, and the type of color on the third region.

The processor 420 may determine that a color selected among the colors displayed on the third region is a color to be displayed on the first region. The processor 420 may change the attribute of the determined color based on at least one of the time or area of the input of the brush to the second region. The attribute may include the amount of water, the amount of water evaporating, the amount of water spreading, or a combination thereof. The attribute may include at least one of the brightness, chroma, transparency, sharpness, or lightness and darkness of color.

According to an embodiment of the present disclosure, the processor 420 may provide various drawing effects depending on the attribute of the color. For example, the processor 420 may provide an oil painting effect based on the attribute including at least one of the amount of water or the amount of water evaporating and a pastel effect based on the attribute including the amount of water spreading.

According to an embodiment of the present disclosure, the processor 420 may determine the attribute of the object according to the type of the object displayed on the first region, e.g., the type of canvas, and may change the attribute of the color based on the attribute of the object. For example, at least one of the amount of water, the amount of water evaporating or the amount of water spreading preset corresponding to the type of the canvas may be provided as the attribute of the object, and the attribute of the color may be changed according to the attribute of the canvas displayed on the first region.

According to an embodiment of the present disclosure, the processor 420 may determine the attribute of the object displayed on the first region based on the position of at least a portion of the first region, where the brush is inputted, or the angle of the brush inputted to the, at least, portion. For example, at least one of the amount of water, the amount of water evaporating or the amount of water spreading preset corresponding to the position of the canvas or the angle of the brush inputted to the canvas may be provided as the attribute of the object, and the attribute of the color may be changed according to the attribute of the canvas displayed on the first region.

According to an embodiment of the present disclosure, the memory 430 may be the memory 130 shown in FIG. 1. According to an embodiment of the present disclosure, the memory 430 may store the amount of water in the contact portion of the stylus brush corresponding to at least one of the type or material of the brush, distance between the display and the brush, input time of the brush or input speed of the brush.

According to an embodiment of the present disclosure, the memory 430 may store the amount of water in the canvas corresponding to at least one of the type of canvas, position in the canvas where the brush contacts, type of the brush, or distance between the display and the brush.

According to an embodiment of the present disclosure, the memory 430 may store the amount of water spreading on the canvas corresponding to at least one of the type or material of canvas, material of the brush, distance between the display and the brush or the slope of the electronic device.

According to an embodiment of the present disclosure, the touchscreen display 410 may include a touch panel, the processor 420 may be electrically connected to the display, and the memory 430 may be electrically connected with the processor, wherein the memory 430 may store instructions executed to enable the processor 420 to receive, from the touch panel, first data regarding a time and/or area contacted by an external object through a first region on the display, receive, from the touch panel, second data regarding a contact or approach of the external object to a second region of the display after the external object is spaced apart from the display, and display an image or an image variation on the display based on at least some of the first data and the second data.

According to an embodiment of the present disclosure, the external object may include a stylus brush.

The instructions may enable the processor 420 to display a user interface in response to a user input, and the user interface may display the first region and the second region.

According to an embodiment of the present disclosure, the first region displayed on the user interface may include an image representing a bucket.

According to an embodiment of the present disclosure, the second region displayed on the user interface may include an image having a canvas or paper texture.

According to an embodiment of the present disclosure, the user interface may further include an image representing the brush.

According to an embodiment of the present disclosure, the instructions may be configured to enable the processor 420 to vary the image representing the brush based on at least a portion of the first data.

According to an embodiment of the present disclosure, the instructions may be configured to enable the processor 420 to vary the image representing the brush based on at least a portion of the second data.

According to an embodiment of the present disclosure, the instructions may be configured to enable the processor 420 to compare the first data with a time and/or area-related threshold, and when the first exceeds the threshold, display a preset image or image variation on the display when the brush is spaced apart from the display and then contacts or approaches the second region of the touchscreen display.

According to an embodiment of the present disclosure, the instructions may be configured to enable the processor 420 to determine the type of the brush and display an image or image variation on the display based on at least a portion of the determined type of the brush.

According to an embodiment of the present disclosure, the first data and/or the second data may include at least one of a coordinate, area, or signal strength detected based on the contact or approach by the touch panel.

According to an embodiment of the present disclosure, the instructions may be configured to enable the processor 420 to adjust the amount of water of the brush and display an image or image variation on the display based on an input of the brush having the amount of water adjusted.

According to an embodiment of the present disclosure, the amount of water of the brush may be adjusted based on at least one of the type or material of the brush, distance between the display and the brush, input time of the brush or input speed of the brush.

According to an embodiment of the present disclosure, the instructions may be configured to enable the processor 420 to adjust the amount of water of the canvas and display an image or image variation on the display based on the canvas having the amount of water adjusted.

According to an embodiment of the present disclosure, the amount of water of the canvas may be adjusted based on at least one of the type of canvas, position in the canvas where the stylus brush contacts, type of the brush, and distance between the display and the brush.

According to an embodiment of the present disclosure, the instructions may be configured to enable the processor 420 to adjust the amount of water spreading on the canvas and display an image or image variation on the display based on the canvas having the amount of water spreading adjusted.

According to an embodiment of the present disclosure, the amount of water spreading on the canvas may be adjusted based on at least one of the type or material of the canvas, the material of the brush, the distance between the display and the brush, or the slope of the electronic device.

According to an embodiment of the present disclosure, the display 410 and the processor 420 may be included. The processor 420 may be configured to determine a color in which an external object is to be displayed on a first region of the display, determine an attribute of the color based on a time or area of an input of the external object to a second region of the display, and display at least a portion of the first region selected based on the input of the external object using the color having the attribute reflected.

According to an embodiment of the present disclosure, the attribute may include the amount of water, the amount of water evaporating, the amount of water spreading, or a combination thereof.

According to an embodiment of the present disclosure, the attribute may include at least one of the brightness, chroma, transparency, sharpness, or lightness and darkness of color.

According to an embodiment of the present disclosure, an oil painting effect may be provided based on the attribute including at least one of the amount of water or the amount of water evaporating, and a pastel effect may be provided based on the attribute including the amount of water spreading.

According to an embodiment of the present disclosure, the processor 420 may be configured to determine an attribute of an object represented by the first region and change the attribute of the color based on the attribute of the object.

According to an embodiment of the present disclosure, the processor 420 may be configured to determine the attribute of the object based on a position in the first region of, at least, the portion or an angle of, at least, the portion with respect to the external object.

Figure 22:
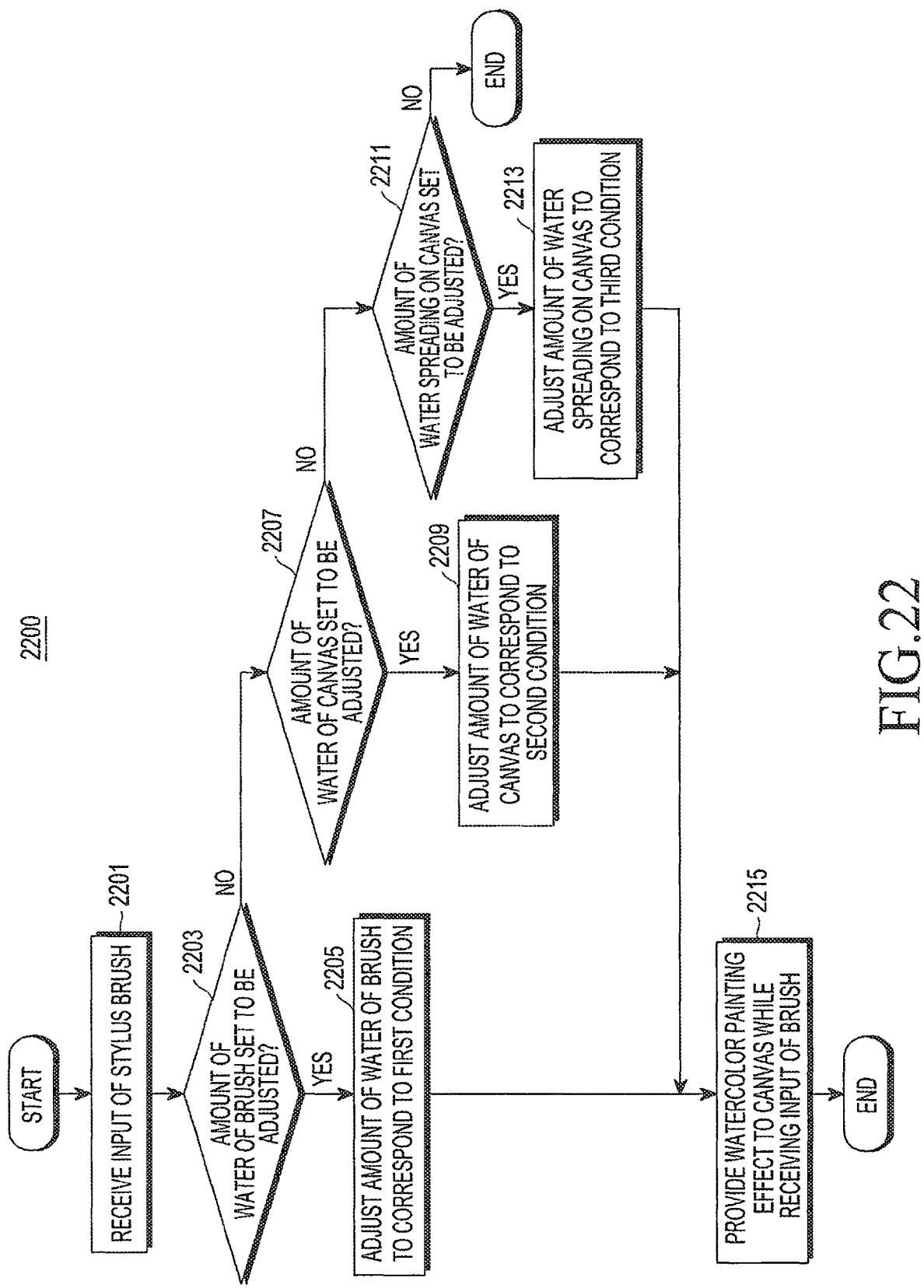
FIG. 22 is a flowchart illustrating an input control method in an electronic device according to an embodiment of the present disclosure.

FIG. 22 is a flowchart illustrating an input control method in an electronic device according to an embodiment of the present disclosure.

Referring to FIG. 22, an input control method 2200 in an electronic device as shown in FIG. 22 according to an embodiment of the present disclosure may be described taking an example in which it is performed by the processor 420 of the electronic device 401 of FIG. 4. Referring to FIG. 22, when an external object, e.g., an input device, is inputted (contacting or approaching) the display 410, the processor 420 may receive an input of the stylus brush based on data (e.g., coordinates, signal strength, and area) regarding the input of the input device received from the display 410 in operation 2201.

In operation 2203, the processor 420 may be set to adjust the amount of water in the brush, and in operation 2205, the processor 420 may adjust the amount of water in the contact portion of the stylus brush corresponding to a first condition. The first condition may include at least one of the type or material of the brush, distance between the display and the brush, input time of the brush or input speed of the brush. In operation 2215, the processor 420 may provide a watercolor painting effect depending on the amount of water set for the contact portion of the stylus brush while receiving the input of the brush having the water amount adjusted.

In operation 2207, the processor 420 may be set to adjust the amount of water in the canvas, and in operation 2209, the processor 420 may adjust the amount of water in the canvas corresponding to a second condition. The second condition may include at least one of the type of canvas, position in the canvas where the stylus brush contacts, type of the brush, and distance between the display and the brush. In operation 2215, the processor 420 may provide a watercolor painting effect depending on the amount of water set for the canvas while receiving the input of the brush having the water amount adjusted.

In operation 2211, the processor 420 may be set to adjust the amount of water spreading on the canvas, and in operation 2213, the processor 420 may adjust the amount of water spreading on the canvas corresponding to a third condition. The third condition may include at least one of the type or material of the canvas, material of the brush, distance between the display and the brush, or the slope of the electronic device. In operation 2215, the processor 420 may provide a watercolor painting effect depending on the amount of water spreading set for the canvas while receiving the input of the brush having the amount of water spreading adjusted.

Figure 23:
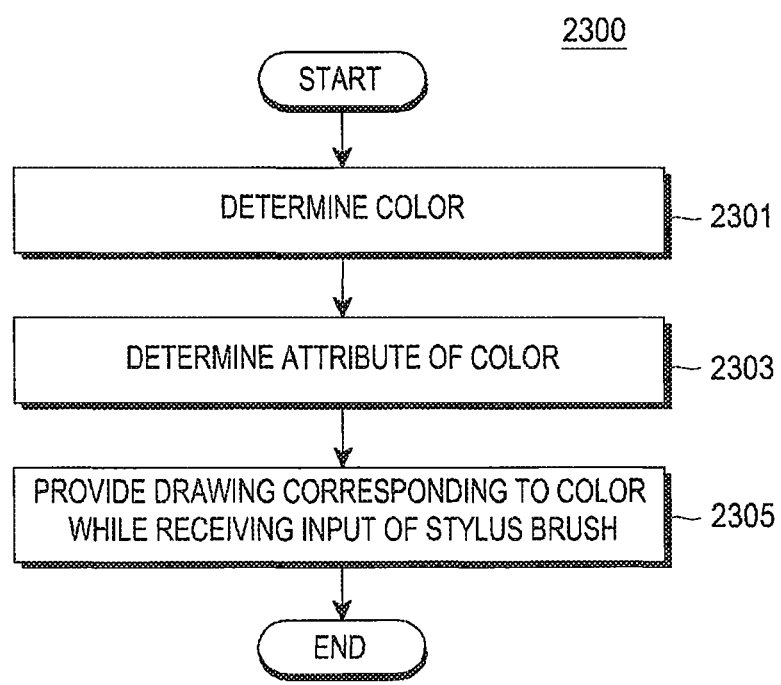
FIG. 23 is a flowchart illustrating an input control method in an electronic device according to an embodiment of the present disclosure.

FIG. 23 is a flowchart illustrating an input control method in an electronic device according to an embodiment of the present disclosure.

Referring to FIG. 23, another input control method 2300 in an electronic device as shown in FIG. 23 according to an embodiment of the present disclosure may be described taking an example in which it is performed by the processor 420 of the electronic device 401 of FIG. 4. Referring to FIG. 23, the display 410 may display a first region for displaying a drawing, a second region displaying an object capable of adjusting water, and a third region displaying the type of color. In operation 2301, the processor 420 may determine that a color selected by an external object, e.g., the stylus brush, from among colors displayed on the third region is a color to be displayed on the first region. In operation 2303, the processor 420 may determine the attribute of the determined color. The processor 420 may change the attribute of the color according to the time or area of the input of the brush to the second region. The processor 420 may determine the attribute of the object according to the type of the object displayed on the first region, e.g., the type of canvas, and may change the attribute of the color depending on the attribute of the object. The processor 420 may determine the attribute of the object depending on the position of at least a portion of the first region where the brush is inputted or the angle of the brush inputted to the, at least, portion and change the attribute of the color depending on the attribute of the object.

In operation 2305, the processor 420 may provide a drawing corresponding to the color having the attribute reflected on the canvas where the first region is displayed while the input of the brush is received.

According to an embodiment of the present disclosure, a method for controlling an input in an electronic device may comprise receiving, from a touch panel of a display, first data regarding a time and/or area contacted by an external object through a first region on the display, receiving, from the touch panel, second data regarding a contact or approach of the external object to a second region of the display after the external object is spaced apart from the display, and displaying an image or an image variation on the display based on at least some of the first data and the second data.

According to an embodiment of the present disclosure, the method may further comprise displaying a user interface including the first region and the second region on the display in response to a user input, and the external object may include a stylus brush.

According to an embodiment of the present disclosure, the first region displayed on the user interface may include an image representing a bucket.

According to an embodiment of the present disclosure, the second region displayed on the user interface may include an image having a canvas or paper texture.

According to an embodiment of the present disclosure, the user interface may further include an image representing the brush.

According to an embodiment of the present disclosure, the image representing the brush may be varied based on at least a portion of the first data.

According to an embodiment of the present disclosure, the image representing the brush may be varied based on at least a portion of the second data.

According to an embodiment of the present disclosure, the method may further comprise comparing the first data with a time and/or area-related threshold, and when the first exceeds the threshold, displaying a preset image or image variation on the display when the brush is spaced apart from the display and then contacts or approaches the second region of the touchscreen display.

According to an embodiment of the present disclosure, the method may further comprise determining the type of the brush and displaying an image or image variation on the display based on at least a portion of the determined type of the brush.

According to an embodiment of the present disclosure, the first data and/or the second data may include at least one of a coordinate, area, or signal strength detected based on the contact or approach by the touch panel.

According to an embodiment of the present disclosure, the method may further comprise adjusting the amount of water of the brush and displaying an image or image variation on the display based on an input of the brush having the amount of water adjusted.

According to an embodiment of the present disclosure, the amount of water of the brush may be adjusted based on at least one of the type or material of the brush, distance between the display and the brush, input time of the brush or input speed of the brush.

According to an embodiment of the present disclosure, the method may further comprise adjusting the amount of water of the canvas and displaying an image or image variation on the display based on the canvas having the amount of water adjusted.

According to an embodiment of the present disclosure, the amount of water of the canvas may be adjusted based on at least one of the type of canvas, position in the canvas where the stylus brush contacts, type of the brush, and distance between the display and the brush.

According to an embodiment of the present disclosure, the method may further comprise adjusting the amount of water spreading on the canvas and displaying an image or image variation on the display based on the canvas having the amount of water spreading adjusted.

According to an embodiment of the present disclosure, the amount of water spreading on the canvas may be adjusted based on at least one of the type or material of the canvas, the material of the brush, the distance between the display and the brush, or the slope of the electronic device.

According to an embodiment of the present disclosure, a storage medium may store instructions configured to, when executed by at least one processor, enable the at least one processor to perform at least one operation that may include receiving, from a touch panel of a display, first data regarding a time and/or area contacted by an external object through a first region on the display, receiving, from the touch panel, second data regarding a contact or approach of the external object to a second region of the display after the external object is spaced apart from the display, and displaying an image or an image variation on the display based on at least some of the first data and the second data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display including a touch panel;
   a processor electrically connected to the display; and
   a memory electrically connected with the processor,
   wherein the memory stores instructions executed to enable the processor to:
      detect contact time and contact area of an external object contacting a first region of the display and receive first data regarding an amount of water determined based on the contact time and the contact area of the external object,
      receive second data regarding a contact or an approach of the external object to a second region of the display after the external object is spaced apart from the display, and
      display an image reflecting the amount of water corresponding to the received the first data on a position corresponding to the received second data in the second region based on the first data and the second data, and
   wherein if the amount of water of the external object is greater than a threshold based on the first data, provide a dropping effect having amount and speed of water dropping that are adjusted according to the amount of water of the external object.

2. The electronic device of claim 1,
   wherein the external object includes a brush,
   wherein the processor is further configured to display a user interface on the display in response to a user input, and
   wherein the user interface displays the first region or the second region.

3. The electronic device of claim 2, wherein the first region displayed on the user interface includes an image representing a bucket.

4. The electronic device of claim 2, wherein the second region displayed on the user interface includes an image having a canvas or paper texture.

5. The electronic device of claim 2, wherein the user interface further includes an image representing the brush.

6. The electronic device of claim 5, wherein the processor is further configured to vary the image representing the brush based on at least part of the first data.

7. The electronic device of claim 5, wherein the processor is further configured to vary the image representing the brush based on at least part of the second data.

8. The electronic device of claim 1, wherein the processor is further configured to:
   compare time information of the first data with a time related threshold or area information of the first data with an area related threshold, and
   display, when the time information of the first data exceeds the threshold time related or the area information of the first data exceeds the area related threshold, a preset image or image variation on the display when a brush is spaced apart from the display and contacts or approaches the second region of the display.

9. The electronic device of claim 2, wherein the processor is further configured to:
   determine a type of the brush, and
   display an image or image variation on the display based on at least part of the determined type of the brush.

10. The electronic device of claim 1, wherein the first data or the second data includes a coordinate, area, or signal strength detected based on the contact or the approach by the touch panel.

11. The electronic device of claim 1, wherein the processor is further configured to:
    determine a color in which an external object is to be displayed on a first region of the display,
    determine an attribute of the color based on a time and area of an input of the external object to a second region of the display,
    determine the attribute of the external object based on a type of the external object,
    determine an attribute of a first object based on a type of the first object represented in the first region,
    change the attribute of the color based on the attribute of the first object or the attribute of the external object, and
    display at least part of an area, in the first region, selected based on the input of the external object using the color having the attribute reflected.

12. The electronic device of claim 11, wherein the attribute includes an amount of water, the amount of water evaporating, or the amount of water spreading.

13. The electronic device of claim 11, wherein the attribute includes brightness, chroma, transparency, sharpness, or lightness and darkness of the color.

14. The electronic device of claim 12, wherein the electronic device provides an oil painting effect based on the attribute including the amount of water or the amount of water evaporating or a pastel effect based on the attribute including the amount of water spreading.

15. The electronic device of claim 11, wherein the processor is further configured to determine the attribute of the first object based on a position of the area in the second region or an angle of the area with respect to the external object.

16. A method for controlling an input in an electronic device, the method comprising:
    detecting contact time and contact area of an external object contacting a first region of a display including a touch panel;
    receiving first data regarding an amount of water determined based on the contact time and the contact area of the external object;
    receiving second data regarding a contact or approach of the external object to a second region of the display after the external object is spaced apart from the display; and
    displaying an image reflecting the amount of water corresponding to the received the first data on a position corresponding to the received second data in the second region based on the first data and the second data,
    wherein if the amount of water of the external object is greater than a threshold based on the first data, provide a dropping effect having amount and speed of water dropping that are adjusted according to the amount of water of the external object.

17. The method of claim 16, further comprising:
displaying a user interface including the first region or the second region on the display in response to a user input, wherein the external object includes a brush.

18. The method of claim 17, further comprising:
adjusting an amount of water of the brush; and
displaying an image or image variation on the display based on an input of the brush having the amount of water adjusted.

19. The method of claim 18, wherein the amount of water of the brush is adjusted based on a type of the brush or a material of the brush, distance between the display and the brush, an input time of the brush or an input speed of the brush.

20. The method of claim 17, further comprising:
adjusting an amount of water of a canvas; and
displaying an image or image variation on the display based on the canvas having the amount of water adjusted.

21. The method of claim 20, wherein the amount of water of the canvas is adjusted based on a type of the canvas, a position in the canvas where the brush contacts the display, a type of the brush, or distance between the display and the brush.

22. The method of claim 21, wherein the amount of water on the canvas is adjusted to correspond to the amount of water set for a particular position of the canvas.

23. The method of claim 17, further comprising:
adjusting an amount of water spreading on a canvas, and
displaying an image or image variation on the display based on the canvas having the amount of water spreading adjusted.

24. The method of claim 23, wherein the amount of water spreading on the canvas is adjusted based on a type of the canvas or a material of the canvas, the material of the brush, a distance between the display and the brush, or a slope of the electronic device.

* * * * *